United States Patent
Yamasita

[11] 4,138,192
[45] Feb. 6, 1979

[54] FOWARD-OBLIQUE VIEWING OPTICAL SYSTEM

[75] Inventor: Nobuo Yamasita, Tama, Japan

[73] Assignee: Olympus Optical Company, Tokyo, Japan

[21] Appl. No.: 765,754

[22] Filed: Feb. 4, 1977

Related U.S. Application Data

[63] Continuation-in-part of Ser. No. 531,742, Dec. 11, 1974, abandoned.

[30] Foreign Application Priority Data

Dec. 13, 1973 [JP] Japan .................. 48/138081

[51] Int. Cl.² ............................................. G02B 23/02
[52] U.S. Cl. ........................................ 350/25; 350/204
[58] Field of Search ................. 350/25, 202, 203, 286, 350/96 B, 80, 52, 301, 96.24, 204, 26; 128/4–8; 356/241–254, 255

[56] References Cited

U.S. PATENT DOCUMENTS

| | | | |
|---|---|---|---|
| 1,530,081 | 3/1925 | Humbrecht et al. | 350/26 |
| 1,703,215 | 2/1929 | Wappler | 350/202 |
| 2,678,580 | 5/1954 | Erban | 350/203 |
| 2,783,757 | 3/1957 | Scholz | 350/202 |
| 3,664,730 | 5/1972 | Cardona | 350/203 |
| 3,833,291 | 9/1974 | Samuelson | 350/286 |
| 3,918,072 | 11/1975 | Imai et al. | 350/96.26 |

Primary Examiner—John K. Corbin
Assistant Examiner—B. Wm. de los Reyes
Attorney, Agent, or Firm—Cushman, Darby & Cushman

[57] ABSTRACT

A forward-oblique viewing optical system for endoscopes comprising an observing-direction changing prism which has a surface for refracting rays from an object to be observed and is arranged in front of an objective, said optical system as a whole thereby being made compact.

4 Claims, 5 Drawing Figures

FORWARD-OBLIQUE VIEWING OPTICAL SYSTEM

This application is a continuation-in-part of application Ser. No. 531,742, now abandoned filed Dec. 11, 1974.

BACKGROUND OF THE INVENTION (a) Field of the Invention

The present invention relates to a forward-oblique viewing optical system which is to be applied to long and slender image-transmitting optical systems such as endoscopes and for which the observing direction is at a pre-determined angle in respect to the image-transmitting direction (longitudinal direction of the endoscope).

(b) Description of the Prior Art

An optical system in a distal end of a long and slender image-transmitting optical system is generally required to be small in size especially in its outer diameter. This is due to the following reasons. That is, if an outer diameter of an endoscope, for example, is larger, the patient has to feel severe pain at the time of inserting. Moreover, the outer diameter will be physically limited by the portion to be observed and it will becomes sometimes impossible to insert the distal end when its diameter is large. For a cystoscope, for example, the outer diameter of the distal end is required to be very small, i.e., 2 mm to 3 mm.

For optical systems to be arranged in the distal end of the diameter limited as above and to be used for purposes other than forward viewing, said purposes can be attained by employing a right-triangular prism of 45° or 30° in case of side viewing when the observing direction is at 90° in respect to the longitudinal direction of the endoscope or in case of forward-oblique viewing when the observing direction is at 60°. In case of forward-oblique viewing when the observing direction is at 30° from the forward-viewing direction, however, it is unavoidable to arrange the optical system as shown in FIG. 1A and FIG. 1B. That is, as shown in FIG. 1A or FIG. 1B, it is necessary to arrange a prism $P_1$ or $P_2$ of special shape in front of the objective O of the endoscope in order to change the direction of rays from the object to be observed, which is in forward-oblique direction in respect to the optical axis of the objective 0, into the direction along the O, axis of the objective O. Reference symbol I.G. in said figures represent an image-transmitting optical element such as image fiber which is arranged according to known art so that an image of the object will be focused on its end face by means of the objective. When, however, a prism of special shape as mentioned in the above is adopted, the length represented by reference symbol h in said figures becomes large and, therefore, it becomes impossible to satisfy the above-mentioned requirement to make the diameter of the distal end small. If the outer diameter is made small in case of the optical system employing a prism of special shape as shown in FIG. 1A and 1B in order to satisfy said requirement, it becomes impossible to assure sufficient effective diameters on entrance and exit surfaces.

SUMMARY OF THE INVENTION

It is, therefore, a primary object of the present invention to provide a forward-oblique viewing optical system for endoscopes comprising an observing-direction changing prism having a surface for refracting rays and arranged in front of an objective of an endoscope.

Another object of the present invention is to provide a forward-oblique viewing optical system for endoscopes further comprising a correcting prism for correction of astigmatism arranged in front of said observing-direction changing prism.

DETAILED DESCRIPTION OF THE PREFERRED EMBODIMENTS

Figure 1A:
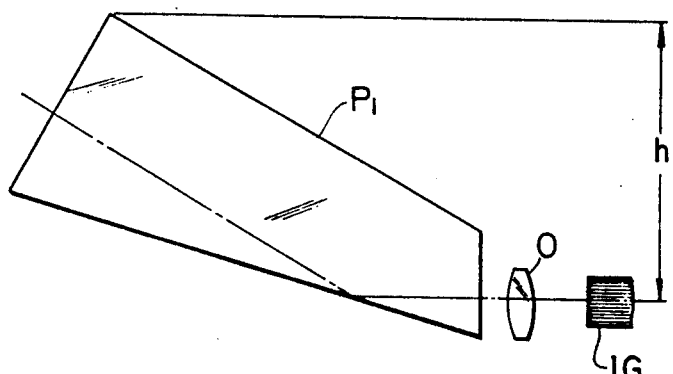
FIG. 1A and FIG. 1B respectively show sectional views illustrating known forward-viewing optical systems arranged in distal ends of endoscopes.
Figure 1B:
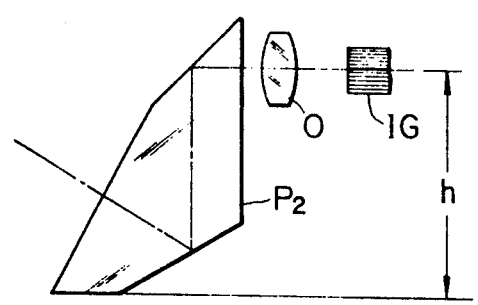
Figure 2:
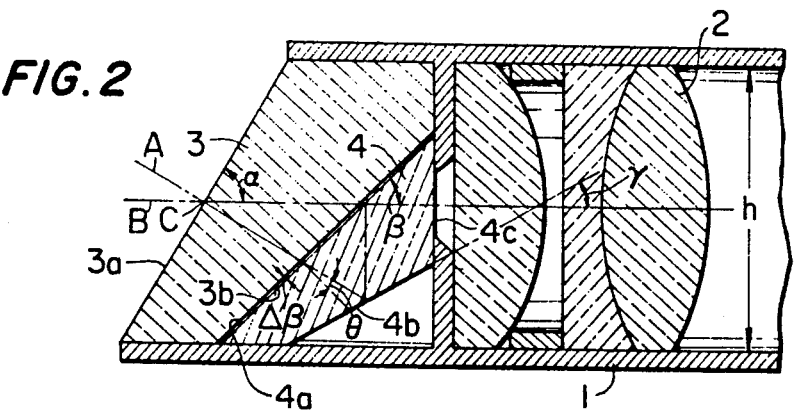
FIGS. 2, 3 and 4 respectively show sectional views illustrating respective embodiments of the forward-viewing optical system according to the present invention.

In FIG. 2, numeral 1 designates a distal end of an endoscope or the like. Numeral 2 designates an objective arranged to focus an image of an object to be observed onto an end face of an image-transmitting element such as image fiber according to known art. In front of said objective 2, a correcting prism 3 and observing-direction changing prism 4 are arranged. Said correcting prism 3 and observing-directing changing prism 4 are respectively of shapes as shown in FIG. 2 and are arranged to satisfy an equation shown below when reference symbols $n_1$ and $n_2$ respectively represent refractive indexes of respective prisms, reference symbol $\alpha$ represents an angle of inclination of an entrance surface $3a$ of the correcting prism 3 in respect to the forward-viewing direction, reference symbols $\beta$ and $\gamma$ respectively represent angles of inclination of surfaces $4a$ and $4b$ of the observing-direction changing prism 4 in respect to the forward-viewing direction, and reference symbol $\Delta\beta$ represents an angle between a surface $3b$ of the correcting prism 3 and the surface $4a$ of the observing-direction changing prism 4.

$$\tan\Delta\beta = \frac{(n_1 - n_2)\sin\theta}{n_1\cos\theta - \sqrt{1 - n_2^2\sin^2\theta}}$$

where, $\theta = 90° - 3\beta + 2\gamma$

Besides, the surface $4a$ of the observing-direction changing prism 4 is arranged approximately at an angle of $\beta + \Delta\beta$ in respect to the optical axis of rays which go out through the surface $4c$ of said prism 4.

The optical system according to the present invention is arranged as above so that the observing direction is changed by the prism 4 and, at the same time, that rays entering the prism 4 are refracted in order to make the outer diameter small. When, however, rays are refracted as above, astigmatism is caused and the quality of the image decreases considerably. Especially when the optical system is used as a retrofocus-type ultra-wide angle lens by arranging a convex lens at the front as in the case of other embodiments to be described later, the above-mentioned astigmatism is caused considerably and gives extremely large influence on the quality of the image. As a result, it becomes practically impossible to use the optical system. The correcting prism 3 is employed chiefly for the purpose of correcting said astigmatism. Especially, the surface $3b$ of said correcting prism 3 is for the purpose of correcting astigmatism which is caused by the refracting surface $4a$ of the observing-direction changing prism 4. For this purpose, it is so arranged that refractive powers of both refracting surfaces, i.e., the surface 3b of the correcting prism 3 and surface 4a of the observing-direction changing prism 4, become equal or approximately equal to each other.

Besides, it is preferable that the intersecting point C of the surface 3a of the correcting prism 3 and the optical axis of entrance rays (axis A) approximately coincides with the intersecting point of the surface 3a of the correcting prism and the optical axis (axis B) of the objective 2. This is effective for correcting astigmatism favourably and also for making the optical system as a whole compact.

Moreover, it is preferable that the surface 3a of the correcting prism 3 and surface 4c of the observing-direction changing prism 4 are perpendicular or approximately perpendicular to the optical axis of the rays for the purpose of preventing astigmatism and for preventing change of the field angle in cases that the distal end of the endoscope is used in air and in water.

For reasons as described in the above, refractive indexes and shapes of the correcting prism 3 and observing-direction changing prism are selected so that the angle $\Delta\beta$ between the surface 3b of the correcting prism 3 and surface 4a of the observing-direction changing prism 4 satisfies the following equation as described before.

$$\tan\Delta\beta = \frac{(n_1 - n_2)\sin\theta}{n_1\cos\theta - \sqrt{1 - n_2^2\sin^2\theta}}$$

In the above equation, n1 and n2 may be either n1 = n2 or n1 ≠ n2. In case of n1 = n2, $\tan\Delta\beta$ becomes $\tan\Delta\beta = 0$ and the surface 3b of the correcting prism 3 becomes parallel with the surface 4a of the observing-direction changing prism 4.

The optical system according to the present invention is thus arranged so that rays from the object to be observed enter the correcting prism 3 in the direction perpendicular to the surface 3a of the prism 3 and the surface 4a of the observing-direction changing prism 4 is utilized as a reflecting surface as well as a refracting surface. Therefore, rays reflected by the reflecting surface 4b are further reflected by the surface 4a and, then, go out through the surface 4c in the direction approximately perpendicular to said surface 4c. Therefore, for the surface 4a, it is necessary to arrange its portion required for further reflecting rays, which are reflected by the reflecting surface 4b, as a reflecting mirror by excluding its portion through which rays enter the prism 4. Or, the prism 4 may be designed to have such shape that rays reflected by the surface 4b can be totally reflected by said surface 4a.

Figure 3:
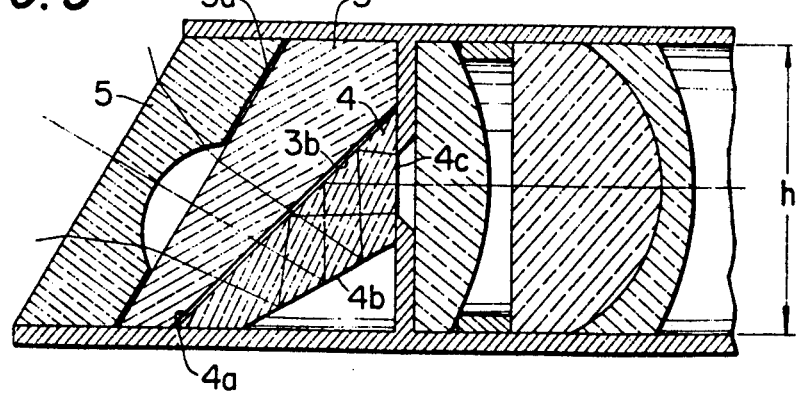

FIG. 3 shows another embodiment of the optical system according to the present invention which is arranged as a wide-angle lens by providing a concave lens 5 in front of the correcting prism 3 of the embodiment shown in FIG. 2. As the other details of this embodiment are substantially same as those of the embodiment shown in FIG. 2, detailed description of this embodiment is omitted here.

Figure 4:
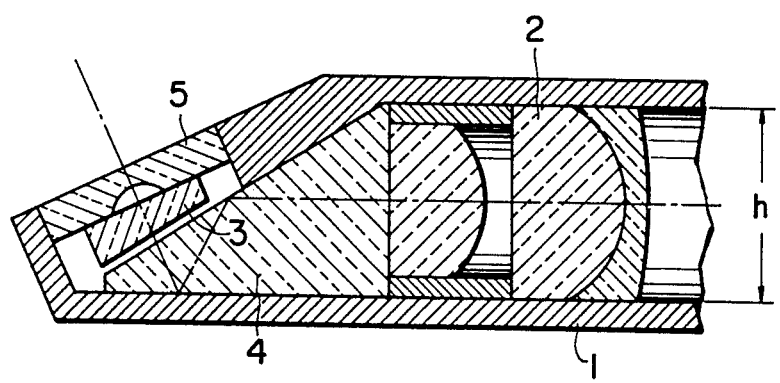

FIG. 4 shows still another embodiment of the optical system according to the present invention. In this embodiment, the observing direction is inclined by about 70° in respect to the forward-viewing direction. Therefore, shapes of the correcting prism 3 and observing-direction changing prism 4 are slightly different from their shapes in the embodiment shown in FIG. 2. However, the other details of this embodiment are substantially same as those of the embodiment shown in FIG. 2.

In the above-mentioned respective embodiments, it is preferable that the distance between the observing-direction changing prism 4 and correcting prism 3, i.e., the distance between surfaces 3b and 4a is as small as possible because aggravation of astigmatism can be made small. Especially when said distance becomes larger than the sum of lengths of passages of rays in prisms 3 and 4, considerable astigmatism will be caused and, moreover, it becomes impossible to make the outer diameter of the distal end satisfactorily small. In practice, the surface 4a can be utilized as a total reflecting surface even when said distance is approximately equal to wavelength of rays. When said distance is made small to that the above-mentioned degree, it is possible to eliminate astigmatism.

Besides, when the portion of the surface 4a of the prism 4 required for further reflecting rays which are reflected by the surface 4b is arranged as a reflecting mirror, the space between said surface 4a and the surface 3b of the prism 3 may be filled with a transparent binding agent. In that case, astigmatism is not caused at all.

As described in the above, the present invention provides a forward-viewing optical system having an observing direction at a small angle, for example at 30°, and an outer diameter which can be limited to an extremely small value and, moreover, enabling to observe with favourable quality of image.

By the present invention, it is possible to obtain various optical systems each having any desired viewing direction up to 75° in respect to the forward-viewing direction by adequately selecting the angles of inclination of surfaces 3a, 3b, 4a and 4b of prisms 3 and 4 in respect to the forward-viewing direction.

I claim:

1. A forward-oblique viewing optical system for endoscopes comprising a correcting prism, a concave lens arranged in front of said correcting prism, an observing-direction changing prism, an objective and an image-transmitting optical element, said correcting prism having an entrance surface arranged perpendicular to the oblique-viewing direction of the endoscope which is inclined at an angle substantially less than 75° in respect to the forward-viewing direction of the endoscope and an exit surface inclined in respect to the forward-viewing direction with an angle of inclination smaller than that of said entrance surface, said observing-direction changing prism having an entrance surface opposed to said exit surface of said correcting prism and separated therefrom, a reflecting surface inclined in respect to the forward-viewing direction by an angle of inclination smaller than that of said entrance surface of said observing-direction changing prism and an exit surface arranged perpendicular to the optical axis of said objective system rays entering said observing-direction changing prism being reflected by said reflecting surface and directed toward said entrance surface of said observing-direction changing prism, being further reflected by said entrance surface of said observing-direction changing prism and then going out of said observing-direction changing prism through said exit surface, said objective being arranged in rear of said observing-direction changing prism, said image-transmitting optical element being arranged in rear of said objective, the entrance surface of said correcting prism and the axis of rays entering said correcting prism approximately coinciding with the intersecting point of said entrance surface of said correcting prism and the optical axis of said objective.

2. A forward-oblique viewing optical system for endoscopes according to claim 1, in which the refractive index of said correcting prism is different from the refractive index of said observing-direction changing prism and in which an angle $\Delta\beta$ between said exit surface of said correcting prism and said entrance surface of said observing-direction changing prism is expressed by the following formula:

$$\tan \Delta\beta = \frac{(n1 - n2) \sin \theta}{n1\cos\theta - \sqrt{1 - n2^2\sin^2\theta}}$$

$\theta = 90° - 3\beta + 2\gamma$
$\alpha \neq \beta + \Delta\beta$ where reference symbol $\alpha$ represents an angle of inclination of said entrance surface of said correcting prism in respect to the optical axis of said objective, reference symbol $\beta$ represents an angle of inclination of said entrance surface of said observing-direction changing prism in respect to the optical axis of said objective, reference symbol $\gamma$ represents the angle between said reflecting surface of said viewing-direction changing prism and the optical axis of said objective, and reference symbols n1 nd n2 respectively represent refractive indexes of said correcting prism and observing-direction changing prism.

3. A forward-oblique viewing optical system for endoscopes according to claim 1, in which the refractive index of said correcting prism is equal to the refractive index of said observing-direction changing prism and in which said exit surface of said correcting prism is parallel with said entrance surface of said observing-direction changing prism.

4. A forward-oblique viewing optical system for endoscopes according to claim 1, in which said entrance surface of said observing-direction changing prism is cemented to said exit surface of said correcting prism with a transparent binding agent filling the space therebetween, and said entrance surface of said observing-direction changing prism at least partially comprising a reflecting mirror for reflecting rays through said exit surface of said observing-direction changing prism.

* * * * *